United States Patent
Seong et al.

(10) Patent No.: US 10,239,412 B2
(45) Date of Patent: Mar. 26, 2019

(54) METHOD AND APPARATUS FOR WIRELESS CHARGING USING VARIABLE SWITCHING FREQUENCY

(71) Applicant: Hyundai Motor Company, Seoul (KR)

(72) Inventors: Hyun Wook Seong, Gyeonggi-do (KR); Woo Young Lee, Gyeonggi-do (KR); Gyu Yeong Choe, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 386 days.

(21) Appl. No.: 15/289,376

(22) Filed: Oct. 10, 2016

(65) Prior Publication Data

US 2017/0101016 A1    Apr. 13, 2017

(30) Foreign Application Priority Data

Oct. 12, 2015 (KR) .................. 10-2015-0142182

(51) Int. Cl.
*H02J 50/12* (2016.01)
*B60L 11/18* (2006.01)
*H02J 7/02* (2016.01)
*H02J 7/00* (2006.01)

(52) U.S. Cl.
CPC ......... *B60L 11/182* (2013.01); *B60L 11/1838* (2013.01); *H02J 7/025* (2013.01); *H02J 50/12* (2016.02); *H02J 7/0052* (2013.01); *H02J 2007/0059* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/163* (2013.01)

(58) Field of Classification Search
CPC . H02J 7/025; H02J 50/12; H02J 50/90; B60L 11/182

See application file for complete search history.

(56) References Cited

U.S. PATENT DOCUMENTS

2013/0187595 A1*  7/2013  Bucher .................. H02J 50/12
                                                                    320/108

* cited by examiner

*Primary Examiner* — Fritz M Fleming
(74) *Attorney, Agent, or Firm* — Mintz Levin Cohn Ferris Glovsky and Popeo, P.C.; Peter F. Corless (57) ABSTRACT

A wireless charging method performed by a wireless power receiving apparatus for a vehicle includes: producing a resonance between a primary pad located outside of the vehicle and a secondary pad installed in the vehicle based on an initial switching frequency; and tuning a switching frequency of a direct current (DC) to DC (DC-to-DC) converter within a range determined based on the initial switching frequency, according to an output voltage outputted based on a resonance of the secondary pad which is caused by the primary pad.

20 Claims, 6 Drawing Sheets

METHOD AND APPARATUS FOR WIRELESS CHARGING USING VARIABLE SWITCHING FREQUENCY

CROSS-REFERENCE TO RELATED APPLICATION

This application claims the benefit of and priority to Korean Patent Application No. 2015-0142182 filed on Oct. 12, 2015 in the Korean Intellectual Property Office (KIPO), the entire contents of which are hereby incorporated by reference as if fully set forth herein.

BACKGROUND

1. Technical Field

The present disclosure relates generally to a wireless charging method for a vehicle, and more particularly, to a method and an apparatus using a variable switching frequency in order to obtain a target output voltage.

2. Related Art

Due to environmental pollution and oil energy depletion, world-wide studies on environment-friendly electric vehicles (EV) have been ongoing. As demands and developments relating to EVs and plug-in hybrid vehicles (PHEV) increase, the on-board charger (OBC) for high-voltage battery charging becomes an essential component in the automobile industry.

Meanwhile, instead of conductive charging for which connectors are used, wireless power transfer (WPT) technologies used for charging high-voltage batteries without connectors have been introduced. WPT technologies have made rapid progress in application domains such as portable device charging and electronic vehicle charging. Notably, wireless charging technologies providing battery charging and freedom from short circuits and wire disconnections have been introduced in the electronic vehicle charging domain.

In a wireless charging system for EV charging, a primary pad and a secondary pad can be modeled as a transformer in an equivalent circuit. As compared with conventional convertor transformers, a coupling coefficient is relatively low since an air-gap between the primary pad and the secondary pad is typically large. That is, since magnetizing inductance is much larger than leakage inductance, it may become difficult to transfer power to an output.

Therefore, a method in which at least one capacitor is applied to the primary pad and secondary pad so that a resonance between the pads is caused by inductance and capacitance of the pads is commonly used. However, when a misalignment between the primary pad and the secondary pad exists, the magnetizing inductance and the leakage inductance may vary, and consequently, the resonance between the pads degrades, and the output power and efficiency of the power transfer decrease. Also, due to manufacturing tolerances of the primary pad, secondary pad, and capacitor, the resonance between the pads may degrade so that the output power and efficiency of the power transfer decrease.

SUMMARY

Accordingly, example embodiments of the present disclosure are provided herein to substantially obviate one or more problems due to limitations and disadvantages of the related art. Example embodiments of the present disclosure provide a wireless charging method using variable switching frequency. Example embodiments of the present disclosure also provide a wireless charging apparatus using variable switching frequency.

According to embodiments of the present disclosure, a wireless charging method, performed by a wireless power receiving apparatus for a vehicle, includes: producing a resonance between a primary pad located outside of the vehicle and a secondary pad installed in the vehicle based on an initial switching frequency; and tuning a switching frequency of a direct current (DC) to DC (DC-to-DC) converter within a range determined based on the initial switching frequency, according to an output voltage outputted based on a resonance of the secondary pad which is caused by the primary pad.

The tuning of the switching frequency may further include determining a final switching frequency by sensing a change of the output voltage according to an increase or a decrease of the switching frequency from the initial switching frequency.

The tuning of the switching frequency may further include determining the final switching frequency by increasing the switching frequency until the output voltage stops increasing and then decreasing the switching frequency until the output voltage stops increasing.

The tuning of the switching frequency may further include determining the final switching frequency by decreasing the switching frequency until the output voltage stops increasing and then increasing the switching frequency until the output voltage stops increasing.

The tuning of the switching frequency may further include maintaining a duty of the switching frequency of the DC-to-DC converter while the switching frequency is being tuned.

The method may further include controlling the duty of the switching frequency of the DC-to-DC converter so that the output voltage reaches a target output voltage after the tuning of the switching frequency is completed.

The initial switching frequency may be 85 kHz.

The range may be 81 kHz to 90 kHz.

Furthermore, according to embodiments of the present disclosure, a wireless power receiving apparatus for a vehicle includes: a secondary pad which is installed in the vehicle and resonates with a primary pad located outside of the vehicle; and a direct current (DC) to DC (DC-to-DC) converter tuning a switching frequency within a range determined based on an initial switching frequency, according to an output voltage outputted based on a resonance of the secondary pad caused by the primary pad.

At least one capacitor may be applied to the secondary pad.

The DC-to-DC converter may operate at a final switching frequency determined by sensing a change of the output voltage according to an increase or a decrease of the switching frequency from the initial switching frequency.

The final switching frequency may be determined by increasing the switching frequency until the output voltage stops increasing and then decreasing the switching frequency until the output voltage stops increasing.

The final switching frequency may be determined by decreasing the switching frequency until the output voltage stops increasing and then increasing the switching frequency until the output voltage stops increasing.

A duty of the switching frequency of the DC-to-DC converter may be maintained while the switching frequency is being tuned.

The DC-to-DC converter may control a duty so that the output voltage reaches a target output voltage after the final switching frequency is determined.

Furthermore, in accordance with embodiments of the present disclosure, a wireless charging system for a vehicle includes: a primary pad located outside of the vehicle to which power is supplied; a secondary pad installed in the vehicle which resonates with the primary pad; and a direct current (DC) to DC (DC-to-DC) converter which is installed in the vehicle and tunes a switching frequency within a range determined based on the initial switching frequency, according to an output voltage outputted based on a resonance of the secondary pad which is caused by the primary pad.

At least one capacitor may be applied to the primary pad and the secondary pad.

Furthermore, in accordance with embodiments of the present disclosure, a wireless charging control method performed in a vehicle assembly (VA) may include: changing a switching frequency sequentially from a first frequency to a second frequency different from the first frequency, when a primary coil of a ground assembly (GA) located outside a vehicle is magnetically coupled to a secondary coil of the VA at the first frequency; detecting wireless power parameters at the second frequency; and changing the switching frequency from the first frequency to a third frequency derived based on the wireless power parameters at which a maximum output voltage, output power, or efficiency can be obtained.

In the detecting the wireless power parameters, a converter connected to the secondary coil may maximize a duty ratio of a switch for controlling output of the converter.

The VA may further transmit, to the GA, a position calibration signal determined according to the wireless power parameters and the third frequency in order to compensate for a misalignment between the primary coil and the secondary coil.

Furthermore, in accordance with embodiments of the present disclosure, a VA of a wireless charging system for EV may include: a frequency changing part configured to change a switching frequency sequentially from a first frequency to a second frequency different from the first frequency, when a primary coil of a GA located outside a vehicle is magnetically coupled to a secondary coil of the VA at the first frequency; a detection part configured to detect wireless power parameters at the second frequency; and a frequency setting part configured to change the switching frequency from the first frequency to a third frequency derived based on the wireless power parameters at which a maximum output voltage, output power, or efficiency can be obtained.

The VA may further comprise a switching control part configured to control a duty ratio of a switch for controlling output of the converter to be maximized.

The VA may further comprise a position calibration signal generation part configured to generate a position calibration signal which is determined according to the wireless power parameters and the third frequency and used for compensating for a misalignment between the primary coil and the secondary coil.

The frequency changing part, the detection part, the frequency setting part, the switching control part, the position calibration signal generation part, or a combination of one or more of them may exist as program codes or one or more functional module stored in a storage means of the VA, and be executed by a controller or a controller element of the VA. At least part of the controller and the controller element may also be used for controlling a DC-to-DC converter.

Furthermore, in accordance with embodiments of the present disclosure, a wireless charging control method performed in a GA may include: transferring, by a primary coil of the GA which is located outside a vehicle and magnetically coupled to a secondary coil of a VA installed in the vehicle, a wireless power at a first frequency; changing a switching frequency sequentially from the first frequency to a second frequency other than the first frequency while transferring the wireless power at the first frequency, and detecting wireless power parameters at the second frequency; and transmitting the detected wireless power parameters to the VA. The VA may obtain, among the second frequencies, a third frequency at which a maximum output voltage, output power, or efficiency can be obtained, according to the wireless power parameters.

The GA may further receive, from the VA, a position calibration signal which is determined according to the wireless power parameters and the third frequency and used for compensating for a misalignment between the primary coil and the secondary coil.

Therefore, the wireless charging methods using variable switching frequency according to example embodiments of the present disclosure have advantages that the output voltage and efficiency degrade gradually even when a front/rear, left/right, or up/down misalignment between the primary and secondary pads exists.

In addition, since the duty of the DC-to-DC convertor is maintained as its maximum value while determining an optimal switching frequency, a zero voltage switching (ZVS) region can be broaden and damages of a switch in the DC-to-DC convertor due to hard switching can be prevented.

BRIEF DESCRIPTION OF DRAWINGS

Example embodiments of the present disclosure will become more apparent by describing in detail example embodiments of the present disclosure with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Example embodiments of the present disclosure are disclosed herein. However, specific structural and functional details disclosed herein are merely representative for purposes of describing example embodiments of the present disclosure, however, example embodiments of the present disclosure may be embodied in many alternate forms and should not be construed as limited to example embodiments of the present disclosure set forth herein. While describing the respective drawings, like reference numerals designate like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

It will be understood that although the terms "first", "second", etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the exemplary embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Hereinafter, example embodiments of the present disclosure will be described in detail with reference to the attached drawings.

Figure 1:
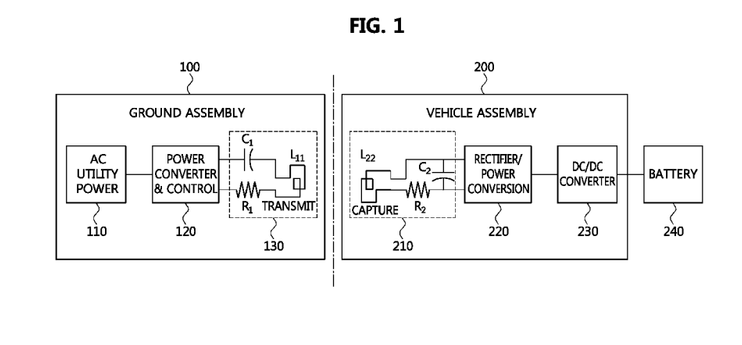
FIG. 1 is a block diagram to explain a principle of a wireless charging system according to embodiments of the present disclosure.

FIG. 1 is a block diagram to explain a principle of a wireless charging system according to embodiments of the present disclosure.

As shown in FIG. 1, a wireless charging system for a vehicle, according to embodiments of the present disclosure, may comprise a vehicle assembly (VA) 200 installed in a vehicle and a ground assembly (GA) 100 located outside the vehicle. The GA 100 may constitute an infrastructure for EV charging.

In the below descriptions, the VA 200 may be identical to a wireless power receiving apparatus of the vehicle, and the GA 100 may be identical to a wireless power transmitting apparatus located outside the vehicle as a part of a charging infrastructure.

The GA 100 may comprise an alternating current (AC) utility power 110, a power converter and control 120, and a primary pad 130.

The AC utility power 110 may mean an AC power supplying part.

The power converter and control 120 may mean circuitry for generating resonance signals by using electric power provided from the AC utility power 110, and comprise a bidirectional inverter, a filter, and a resonant circuit.

The primary pad 130 may perform a role of a power transmitter, and comprise an inductor $L_{11}$, a capacitor $C_1$, and a resistor $R_1$. Here, the primary pad 130 may also be referred to as a GA coil.

Also, the VA 200 may comprise a secondary pad 210, a rectifier/power conversion 220, and a direct current (DC) to DC (DC-to-DC) converter 230, and be connected to a battery 240 of the vehicle.

The secondary pad 210 may perform a role of receiving power transmitted from the primary pad 130, and comprise an inductor $L_{22}$, a capacitor $C_2$, and a resistor $R_2$. Here, the secondary pad 210 may also be referred to as a VA coil.

For example, inductive couplers such as the primary pad 130 and the secondary pad 210 may be designed based on a variety of topologies, and explained according to magnetics. Also, they have magnetic interoperability according to multi-coil topologies including one or all of polarized and non-polarized topologies.

The rectifier/power conversion 220 may include circuitry for transferring power received from the secondary pad 210 to the battery 240, and comprise a resonant circuit, a rectifier, a filter, and an impedance converter.

The DC-to-DC convertor 230 may perform a closed loop control operation to control frequency or power around a resonant frequency for wireless power transfer. That is, the DC-to-DC convertor 230 may control a charging current for the battery by adjusting its switching frequency to perform voltage boosting or dropping.

A wireless charging method using the wireless charging system according to an example embodiment of the present disclosure may be explained as follows.

The VA 200 may determine a charging current for the battery 240 according to a status of the battery 240. The VA 200 may transmit a charger output request message or a charging power request message to a charger that includes the GA 100 via a communication interface (not depicted).

Here, the communication interface may be a wired interface supporting one or more of various wired communication manners or a wireless interface supporting one or more of various wireless communication manners. That is, the communication interface used for data communications in the vehicle may include a serial interface, a controller area network (CAN) interface, an Ethernet interface, a near-distance wireless communication interface, or a combination of one or more of them. The near-distance wireless communication interface may be a Wi-Fi. However, such communication may be not restricted to Wi-Fi.

According to the charger output request message from the VA 200, the GA 100 may control an input current of the AC utility power 110.

Also, the GA 100 may convert 50 or 60 Hz electric operator power into high frequency alternating current (HFAC) power through power/frequency conversion.

Due to flux of the HFAC power, the HFAC power may be transferred from the primary pad 130 to the secondary pad 210 of the vehicle via magnetic coupling.

The HFAC power induced into the secondary pad 210 may be filtered or rectified through the rectifier/power conversion, and converted into a DC having a proper voltage for charging the battery 240. The above-described procedure may be repeated until the VA 200 determines that the battery 240 is fully charged.

Although respective components constituting the wireless charging system according to an example embodiment of the present disclosure are, for convenience of explanation, explained individually, at least two of the components may be combined into a single component, or a single component may be divided into a plurality of sub-components. Even the case, in which at least two of the above-described components are combined or at least one of them is divided, may be included in the scope of the present disclosure, if it does not depart from the fundamentals of the present disclosure.

Figure 2:
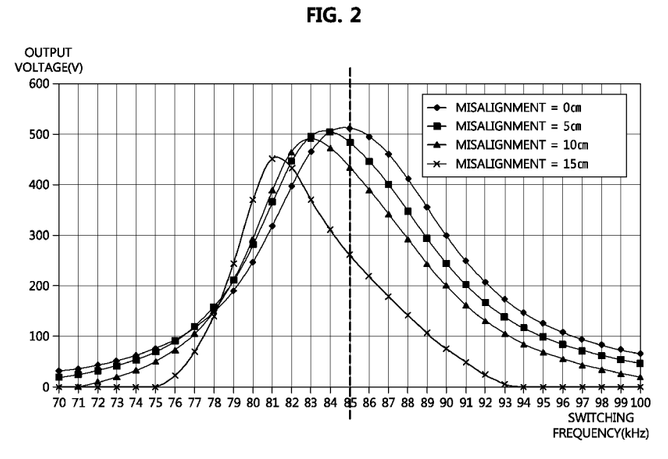
FIG. 2 is an exemplary view to explain a change of an output voltage according to switching frequency when a misalignment exists between a primary pad and a secondary pad.

FIG. 2 is an exemplary view to explain a change of an output voltage according to switching frequency when a misalignment exists between a primary pad and a secondary pad.

As shown in FIG. 2, an output voltage generated when a misalignment between the primary pad 130 in the GA 100 and the secondary pad 210 in the VA 200 exists may be explained based on switching frequency.

First, a case, in which the switching frequency is configured to be 85 kHz when a misalignment between the primary pad 130 and the secondary pad 210 does not exist, may be set as an ideal reference state. That is, in the ideal reference state, an output voltage of about 505V may be obtained when the switching frequency is set to be 85 kHz.

However, the output voltage may drop when a misalignment exists between the primary pad 130 and the secondary pad 210.

For example, in a case that the misalignment between the primary pad 130 and the secondary pad 210 is 5 cm while the switching frequency is maintained as 85 kHz, the output voltage may drop to 480V. The output voltage may drop to 420V when the misalignment is 10 cm, and the output voltage may drop to 260V when the misalignment is 15 cm. Also, as the output voltage drops, efficiency of charging may also degrade.

The below Table 1 may represent changes of magnetizing inductance $L_m$, leakage inductance $L_{lk}$, and resonant frequency according to various misalignments between the primary pad 130 and the secondary pad 210. Here, the resonant frequency has meaning identical to that of the switching frequency.

TABLE 1

| Misalignment | $L_m$ | Primary pad $L_{lk}$ | Secondary pad $L_{lk}$ | Change of resonant frequency |
|---|---|---|---|---|
| 0 cm | 38.3 uH | 358.3 uH | 492.2 uH | — |
| 5 cm | 34.0 uH | 362.9 uH | 501.3 uH | −1.0% (84.1 kHz) |
| 10 cm | 22.2 uH | 375.9 uH | 527.3 uH | −2.4% (82.9 kHz) |
| 15 cm | 8.7 uH | 390.9 uH | 559.5 uH | −4.3% (81.3 kHz) |

As shown in Table 1, when the misalignment between the primary pad 130 and the secondary pad 210 is 5 cm, the resonant frequency may be reduced to about 84.1 kHz. Also, the resonant frequency may be reduced to about 82.9 kHz when the misalignment is 10 cm and, and he resonant frequency may be reduced to about 81.3 kHz when the misalignment is 15 cm.

Thus, referring to FIG. 2 and Table 1, it can be identified that the switching frequency should be adjusted according to the misalignment between the primary pad 130 and the secondary pad 210. That is, the switching frequency may be tuned to about 84.1 kHz for 5 cm misalignment, about 82.9 kHz for 10 cm misalignment, and about 81.3 kHz for 15 cm misalignment.

Furthermore, in addition to the misalignment between the primary pad 130 and the secondary pad 210, the capacitor used for resonance may usually have ±5~10% manufacturing tolerance. The manufacturing tolerance of the capacitor may cause a result which is similar with the above-described result. Thus, the adjustment of the switching frequency is necessary in order to compensate for not only the misalignment between pads but also the manufacturing tolerance of capacitor.

Figure 3:
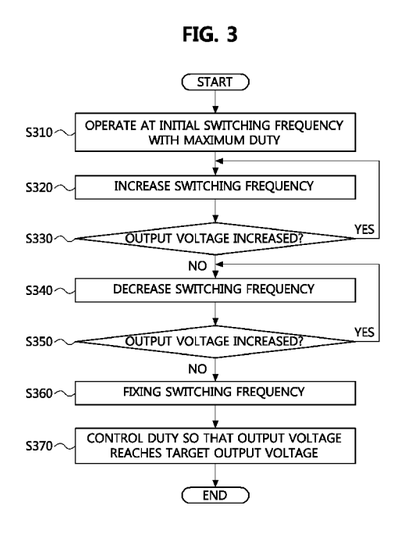
FIG. 3 is a flow chart to explain a wireless charging method using variable switching frequency according to embodiments of the present disclosure.
Figure 4:
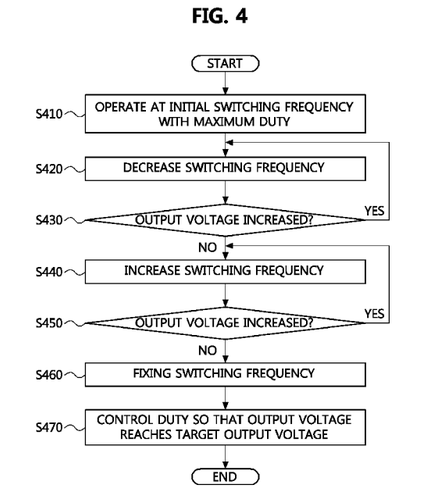
FIG. 4 is another flow chart to explain a wireless charging method using variable switching frequency according to embodiments of the present disclosure.

FIG. 3 is a flow chart to explain a wireless charging method using variable switching frequency according to embodiments of the present disclosure, and FIG. 4 is another flow chart to explain a wireless charging method using variable switching frequency according to embodiments of the present disclosure.

Referring first to FIG. 3, a wireless charging method performed in a wireless power receiving apparatus according to an example embodiment of the present disclosure may be described as follows.

The primary pad 130 and the secondary pad 210 may be initially controlled to operate at an initial switching frequency (S310). More specifically, a resonance between the primary pad 130 located outside the vehicle and the secondary pad 210 installed in the vehicle may be produced at the initial switching frequency. Here, the initial switching frequency may be configured to be 85 kHz.

The switching frequency may be increased from the initial switching frequency (S320). Also, a change of an output voltage from the secondary pad 210, according to increase of the switching frequency, may be identified (S330). If the output voltage is identified as increasing as the switching frequency increases, the switching frequency may be increased consecutively in accordance with the increase of the output voltage.

On the contrary, if the output voltage is not identified as increasing as the switching frequency increases, the switching frequency may be decreased (S340), and a change of the output voltage from the secondary pad 210, according to decrease of the switching frequency, may be identified (S350). If the output voltage is identified as being increasing as the switching frequency decreases, the switching frequency may be decreased consecutively in accordance with the increase of the output voltage.

Therefore, by alternately increasing and decreasing the switching frequency and identifying the output voltage from the secondary pad 210, the switching frequency may be fixed. The switching frequency determined according to the above-described tuning procedure may be referred to herein as a "final switching frequency". Specifically, the switching frequency tuning procedure may be performed while a duty of the DC-to-DC converter is maintained as its maximum value.

Also, once the final switching frequency is determined, the duty can be controlled so that the output voltage reaches a target output voltage (S370).

Referring now to FIG. 4, a wireless charging method performed in a wireless power receiving apparatus according to embodiments of the present disclosure may be described as follows.

The primary pad 130 and the secondary pad 210 may be initially controlled to operate at an initial switching frequency (410).

The switching frequency may be decreased from the initial switching frequency (S420). Also, a change of an output voltage from the secondary pad 210, according to the decrease of the switching frequency, may be identified (S430). If the output voltage is identified as increasing as the switching frequency decreases, the switching frequency may be decreased consecutively in accordance with the increase of the output voltage.

On the contrary, if the output voltage is not identified as increasing as the switching frequency decreases, the switching frequency may be increased (S440), and a change of the output voltage from the secondary pad 210, according to the increase of the switching frequency, may be identified (S450). If the output voltage is identified as increasing as the switching frequency increases, the switching frequency may be consecutively increased in accordance with the increase of the output voltage.

Therefore, by alternately performing increase and decrease of the switching frequency and identifying the output voltage from the secondary pad 210, the switching frequency may be fixed. The switching frequency determined according to the above-described tuning procedure may be referred to as a "final switching frequency". Specifically, the switching frequency tuning procedure may be performed while a duty is maintained as its maximum value.

Also, once the final switching frequency is determined, the duty can be controlled so that the output voltage reaches a target output voltage (S470).

Referring to FIG. 3 and FIG. 4, the switching frequency may be tuned, within a range predetermined based on the initial switching frequency, according to the output voltage caused by the resonance between the primary pad 130 and the secondary pad 210. That is, the final switching frequency may be determined by identifying a change of the output voltage according to increase or decrease of the switching frequency from the initial switching frequency. Here, the predetermined range may be 81 kHz to 90 kHz.

More specifically, the final switching frequency may be determined by increasing the switching frequency until the output voltage stops increasing and then decreasing the switching frequency until the output voltage stops increasing. Alternatively or additionally, the final switching frequency may be determined by decreasing the switching frequency until the output voltage stops increasing and then increasing the switching frequency until the output voltage stops increasing. That is, the final switching frequency may mean a resonant frequency at which a maximum output voltage is generated.

Especially, according to embodiments of the present disclosure, the duty may be maintained as its maximum value while varying the switching frequency so that damage of a switch of the DC-to-DC convertor can be minimized That is, if the switching frequency is changed in a case that the duty of the DC-to-DC convertor 230 is small, a region which a zero voltage switching (ZVC) cannot be performed may occur, and thus the switch may be damaged.

Finally, after the adjustment of the switching frequency completes, the duty may be controlled so that the output voltage reaches the target output voltage.

Referring again to FIG. 1, the VA 200, according to an example embodiment of the present disclosure, may comprise the secondary pad 210 resonating with the primary pad 130 located outside the vehicle, and the DC-to-DC convertor 230 varying the switching frequency, within a range predetermined based on the initial switching frequency, according to the output voltage caused by the resonance of the secondary pad 210 due to the primary pad 130.

The DC-to-DC convertor 230 may operate at the final switching frequency to determined based on the change of the output voltage by increasing or decreasing its switching frequency from the initial switching frequency, and maintain its duty while varying its switching frequency.

Also, after the final switching frequency is determined, the DC-to-DC convertor 230 may control the duty so that the output voltage reaches the target output voltage.

Furthermore, the methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Also, examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa. For example, the GA 200 may comprise a microprocessor in order to perform the wireless charging methods according to example embodiments of the present disclosure.

Figure 5:
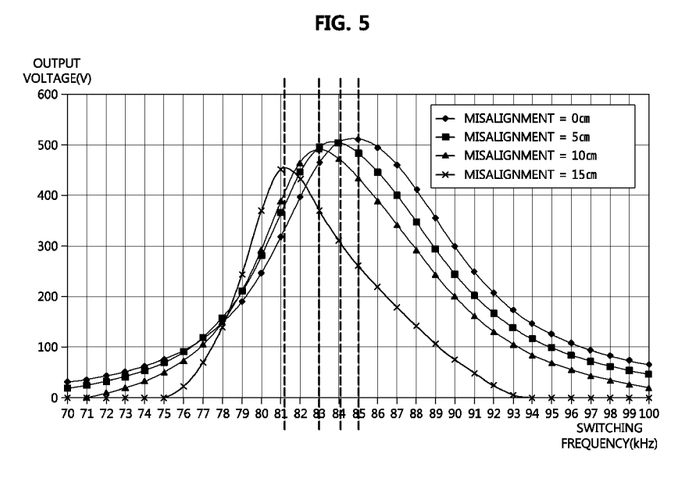
FIG. 5 is an exemplary chart to explain an output voltage when a wireless changing method using variable switching frequency according to embodiments of the present disclosure.
Figure 6:
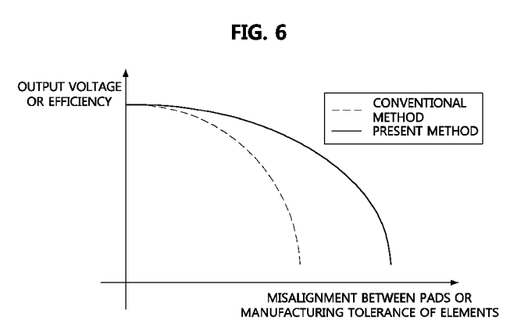
FIG. 6 is a comparison graph to explain effect of a wireless charging method using variable switching frequency according to embodiments of the present disclosure.

FIG. 5 is an exemplary chart to explain an output voltage when a wireless changing method using variable switching frequency according to embodiments of the present disclosure, and FIG. 6 is a comparison graph to explain effect of a wireless charging method using variable switching frequency according to embodiments of the present disclosure.

Referring first to FIG. 6, the output voltage when the switching frequency has been to tuned according to embodiments of the present disclosure is explained.

When a misalignment between the primary pad 130 and the secondary pad 210 does not exist, the switching frequency may be configured to be 85 kHz as an ideal state. That is, in the ideal state, the output voltage of about 505V may be obtained at the 85 kHz switching frequency.

Also, about 500V output voltage may be obtained at 84.1 kHz switching frequency when the misalignment between the primary pad and secondary pad is 5 cm, about 490V output voltage may be obtained at 82.9 kHz switching frequency when the misalignment between the primary pad and secondary pad is 10 cm, and about 450V output voltage may be obtained at 81.3 kHz switching frequency when the misalignment between the primary pad and secondary pad is 15 cm.

The effects when the wireless charging method using variable switching frequency according to embodiments of the present disclosure may be described as the following Table 2.

TABLE 2

| Mis-alignment | Optimal switching frequency | Maximum output voltage according to a conventional method | Maximum output voltage according to the example embodiment of the present disclosure |
|---|---|---|---|
| 0 cm | — | 505 V | 505 V |
| 5 cm | 84.1 kHz | 480 V | 500 V (4.2% ↑) |
| 10 cm | 82.9 kHz | 420 V | 490 V (16.7% ↑) |
| 15 cm | 81.4 kHz | 260 V | 450 V (73.1% ↑) |

As shown in Table 2, when the output voltages according to the conventional method and the present method are compared, the output voltage enhances by 20V (480V→500V) for 5 cm misalignment, 70V (420V→490V) for 10cm misalignment, and 190V (260V→450V) for 15 cm misalignment.

Also, referring to FIG. 6 and Table 2, it can be identified that the effect caused by the switching frequency tuning increases as the misalignment increases.

Therefore, the wireless charging methods using variable switching frequency according to example embodiments of the present disclosure have advantages that the to output voltage and efficiency degrade gradually even when a front/rear, left/right, or up/down misalignment between the primary/secondary pads exists.

In addition, since the duty of the DC-to-DC convertor is maintained as its maximum value while determining an optimal switching frequency, a ZVS region can be broaden and damages of the switch in the DC-to-DC convertor due to hard switching can be prevented.

While the example embodiments of the present disclosure and their advantages have been described in detail, it should be understood that various changes, substitutions and alterations may be made herein without departing from the scope of the disclosure. Thus, the embodiments described herein are intended to cover various modifications and equivalent arrangements included within the spirit and scope of the appended claims.

What is claimed is:

1. A wireless charging method performed by a wireless power receiving apparatus for a vehicle, the method comprising:
producing a resonance between a primary pad located outside of the vehicle and a secondary pad installed in the vehicle based on an initial switching frequency; and
tuning a switching frequency of a direct current (DC) to DC (DC-to-DC) converter within a range determined based on the initial switching frequency, according to an output voltage outputted based on a resonance of the secondary pad which is caused by the primary pad.

2. The method according to claim 1, wherein the tuning of the switching frequency comprises:
determining a final switching frequency by sensing a change of the output voltage according to an increase or a decrease of the switching frequency from the initial switching frequency.

3. The method according to claim 2, wherein the tuning of the switching frequency further comprises:
determining the final switching frequency by increasing the switching frequency until the output voltage stops increasing and then decreasing the switching frequency until the output voltage stops increasing.

4. The method according to claim 2, wherein the tuning of the switching frequency further comprises:
determining the final switching frequency by decreasing the switching frequency until the output voltage stops increasing and then increasing the switching frequency until the output voltage stops increasing.

5. The method according to claim 1, wherein the tuning of the switching frequency comprises:
maintaining a duty of the switching frequency of the DC-to-DC converter while the switching frequency is being tuned.

6. The method according to claim 5, further comprising controlling the duty of the switching frequency of the DC-to-DC converter so that the output voltage reaches a target output voltage after the tuning of the switching frequency is completed.

7. The method according to claim 1, wherein the initial switching frequency is 85 kHz.

8. The method according to claim 1, wherein the range is 81 kHz to 90 kHz.

9. A wireless power receiving apparatus for a vehicle, the apparatus comprising:
a secondary pad which is installed in the vehicle and resonates with a primary pad located outside of the vehicle; and
a direct current (DC) to DC (DC-to-DC) converter tuning a switching frequency within a range determined based on an initial switching frequency, according to an output voltage outputted based on a resonance of the secondary pad caused by the primary pad.

10. The apparatus according to claim 9, wherein at least one capacitor is applied to the secondary pad.

11. The apparatus according to claim 9, wherein the DC-to-DC converter operates at a final switching frequency determined by sensing a change of the output voltage according to an increase or a decrease of the switching frequency from the initial switching frequency.

12. The apparatus according to claim 11, wherein the final switching frequency is determined by increasing the switching frequency until the output voltage stops increasing and then decreasing the switching frequency until the output voltage stops increasing.

13. The apparatus according to claim 11, wherein the final switching frequency is determined by decreasing the switching frequency until the output voltage stops increasing and then increasing the switching frequency until the output voltage stops increasing.

14. The apparatus according to claim 9, wherein a duty of the switching frequency of the DC-to-DC converter is maintained while the switching frequency is being tuned.

15. The apparatus according to claim 14, wherein the DC-to-DC converter controls a duty so that the output voltage reaches a target output voltage after the final switching frequency is determined.

16. A wireless charging system for a vehicle, the system comprising:
- a primary pad located outside of the vehicle to which power is supplied;
- a secondary pad installed in the vehicle which resonates with the primary pad; and
- a direct current (DC) to DC (DC-to-DC) converter which is installed in the vehicle and tunes a switching frequency within a range determined based on the initial switching frequency, according to an output voltage outputted based on a resonance of the secondary pad which is caused by the primary pad.

17. The system according to claim 16, wherein at least one capacitor is applied to the primary pad and the secondary pad.

18. The system according to claim 16, wherein the DC-to-DC converter operates at a final switching frequency determined by sensing a change of the output voltage according to an increase or a decrease of the switching frequency from the initial switching frequency.

19. The system according to claim 16, wherein a duty of the switching frequency of the DC-to-DC converter is maintained while the switching frequency is being tuned.

20. The system according to claim 19, wherein the DC-to-DC converter controls a duty so that the output voltage reaches a target output voltage after the final switching frequency is determined.

* * * * *